Figure 1:
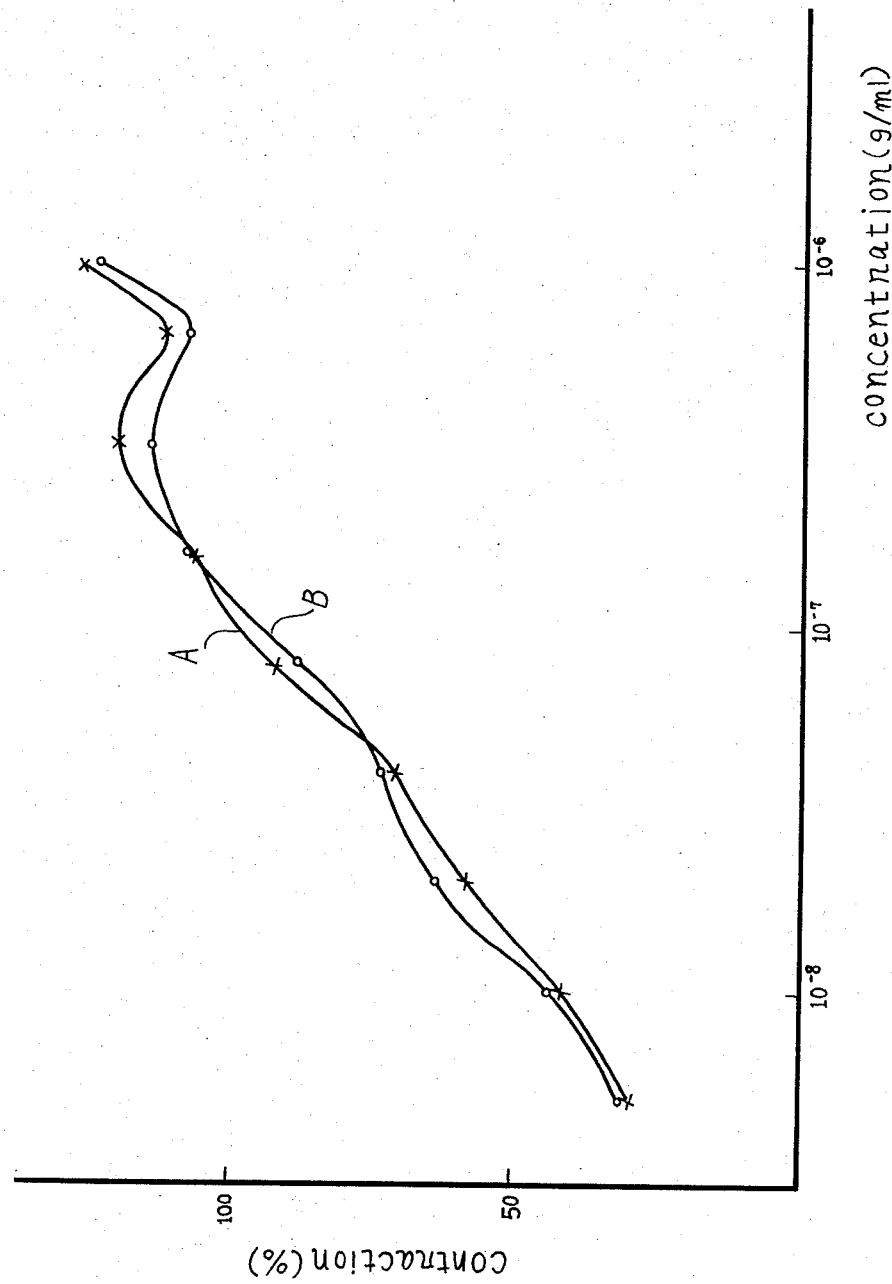

United States Patent

Shimonishi et al.

[11] 3,867,269
[45] Feb. 18, 1975

[54] PROCESS FOR PRODUCING PEPTIDES

[75] Inventors: Yasutsugu Shimonishi, Nishinomiya; Satomi Takahashi, Osaka, both of Japan

[73] Assignee: The President of Osaka University, the Ministry of Education, Japanese Government, Osaka-shi, Japan

[22] Filed: Mar. 5, 1974

[21] Appl. No.: 448,237

[30] Foreign Application Priority Data
Mar. 7, 1973 Japan.............................. 48-27438

[52] U.S. Cl. ............................................ 204/158 S
[51] Int. Cl. .............................................. B01j 1/12
[58] Field of Search ................................. 204/158 S

[56] References Cited
UNITED STATES PATENTS
3,652,434   3/1972   Bar-Nun ........................ 204/158 S

*Primary Examiner*—Howard S. Williams
*Attorney, Agent, or Firm*—Armstrong, Nikaido & Wegner

[57] ABSTRACT

In producing a peptide by coupling an amino acid or oligomer thereof with an amino acid or its oligomer bound to a resin to form a peptide on the resin, cleaving the peptide from the resin and thereafter extracting the peptide, a process which is characterized in that said peptide forming reaction is conducted under the irradiation of ultrasonic waves.

7 Claims, 1 Drawing Figure

PROCESS FOR PRODUCING PEPTIDES

The present invention relates to a process for producing peptides, more particularly to an improved solid phase process for producing peptides.

A solid phase process has been known in the art and comprises the steps of coupling an amino acid or oligomer thereof with an amino acid or its oligomer bound to a resin to form a peptide on the resin, cleaving the peptide from the resin and thereafter extracting the peptide.

This process has the great advantage that the synthesized peptide on resin can be separated from unreacted excess reagents and by-products very easily simply by washing, but it has the drawbacks, inherent to the solid phase process, that the reaction velocity is low and that it is difficult to permit the reaction to proceed uniformly. Particularly, the latter drawback entails a serious problem in the synthesis of peptide from amino acid or its oligomer. According to the solid phase process, the amino acid or their oligomer bound to the resin is liable to react with amino acid or its oligomer unevenly, with the result that the homogeneous products are difficult to be obtained.

An object of this invention is to provide a process which has overcome the abovementioned drawbacks experienced with the conventional solid phase process for producing peptide from amino acid or its oligomer.

Another object of this invention is to provide a solid phase process for producing peptide from amino acid or its oligomer at a greatly increased reaction velocity.

Another object of this invention is to provide a solid phase process for producing homogeneous peptide from amino acid or its oligomer through uniform reaction.

Another object of this invention is to provide a process for producing peptide from amino acid or its oligomer which involves a very short time for the extraction of the peptide obtained.

Still another object of the invention is to provide a process for producing peptide from amino acid or its oligomer in which pretreatment and after-treatment for peptide forming reaction can be conducted in a shortened period of time.

Other objects and advantages of this invention will become apparent from the following description.

In producing a peptide by coupling an amino acid or its oligomer with an amino acid or its oligomer bound to a resin to form a peptide, cleaving the the peptide from the resin and thereafter extracting the peptide, the present process is characterized in that said peptide forming reaction is conducted under the irradiation of ultrasonic waves.

In the conventional solid phase process for synthesizing peptide from amino acid or its oligomer, the present inventors have found that when the condensation reaction for forming peptide-linkage is conducted under ultrasonic wave irradiation, the reaction proceeds uniformly at a greatly increased velocity, whereby homogeneous peptide can be obtained in a shortened period of reaction time. Moreover, the researches have revealed that when the resulting peptide is subjected to solvent extraction under ultrasonic wave irradiation, the extraction time can also be reduced.

Furthermore, the inventors have found that the usual pretreatment and after-treatment for peptide forming reaction such as swelling step, washing steps, deblocking step and neutralizing step, when conducted under ultrasonic wave irradiation, can be completed within a remarkably reduced time. This invention has been accomplished based on these findings.

Usable as the amino acids in the process of this invention are a wide variety of usual amino acids containing amino group and carboxyl group in the molecule thereof. Examples are glycine, alanine, valine, leucine, isoleucine, phenylalanine, tyrosine, methionine, asparagine, aspartic acid, glutamine, glutamic acid, cysteine, arginine, serine, threonine, histidine and like monoaminomonocarboxylic acid, hydroxyamino acid, sulfur-containing amino acid, etc.

Furthermore, examples of amino acid oligomers are origopeptides, i.e., condensation products of 2 to 10 moles of the same or different amino acids, including, for example, dipeptide, tripeptide, tetrapeptide, etc.

These amino acids or their oligomers are used in a form bound to a resin as one of the starting materials, while as another starting material they are used as they are, i.e., in a form not bound to a resin. The kind of resins to be used and procedures for binding amino acids or oligomers thereof to the resin are described hereinbelow.

The solid phase process per se to be employed in this invention can be practiced in the conventional manner. Typically, for example, the procedures therefor involving pretreatment and after-treatment are as follows:

First, the terminal amino groups of amino acids or their oligomers are blocked with protective groups and then the N-blocked amino acids or oligomers thereof are bound to resins which are in solid state under the conditions to be applied in the peptide forming reaction. The blocking can be conducted by reacting amino acids or their oligomers with alkyloxycarbazides such as tertiary butyloxycarbazide, 2-(p-biphenyl)-isopropyloxy-carbazide or the like in the presence of an alkali at room temperature. Among them tertiary butyloxycarbazide which forms tertiary butyloxycarbonyl group (hereinafter referred to as "t-BOC") as a protective group is the most preferable. The method for binding amino acid or its oligomer to resin is not particularly limited, but according to one of preferred methods a resin is first chloromethylated or hydroxymethylated and then the resin thus modified is reacted with N-blocked amino acid or its oligomer in an organic solvent. For this purpose various resins which are solid under the conditions to be applied in the peptide forming reaction can be used, the most preferable example of which is styrene-divinylbenzene copolymer.

The resin having amino acid or its oligomer bound thereto is subjected to swelling and washing steps and then to a step for deblocking the N-terminal blocking group. The swelling step, although not always necessary, is preferable to facilitate the subsequent peptide forming reaction. In this step the resin is brought into contact with an organic liquid capable of swelling the resin, such as methylene chloride, dioxane, dimethylformamide, etc. The subsequent washing step is conducted to remove the swelling agent used by suitable organic solvents such as acetic acid, etc. The deblocking step is carried out using a known chemical such as a mixture of hydrochloric acid and acetic acid or a mixture of trifluoroacetic acid and methylene chloride. The preferable mixing ratio of these mixtures is 1:1 by weight. The deblocking step is conducted in a usual manner, for example, by keeping the resin in contact with the reagent at room temperature. The resin freed of the protective group is washed to remove excess deblocking reagent, thereafter neutralized with a suitable base such as tertiary alkylamine and washed again to remove said base. Thereafter, the resulting amino acid or its oligomer bound to resin is subjected to condensation reaction with amino acid or its oligomer, the amino group thereof being blocked in the same manner as above, to form peptide on the resin. The condensation reaction is carried out at room temperature using a condensing agent such as dicyclohexylcarbodiimide, etc. Washing of the product resulting from the condensation reaction gives peptide as bound to the resin. Usually, the cycle of this procedure is repeatedly conducted to form the desired peptide on the resin.

After washing, the peptide formed on the resin is cleaved from the resin by bringing the resulting resin into contact with a cleaving reagent, such as anhydrous hydrogen fluoride or trifluoroacetic acid saturated with hydrogen bromide. The treatment is usually conducted at a temperature of about 0° to 25°C. After the cleaving reagent is distilled off under reduced pressure, the peptide thus cleaved from the resin is extracted with an organic solvent, such as acetic acid etc., and the resin is filtered off from the extract. Where necessary, the extract is passed through a column of an ion exchange resin such as "Amberlite IR-45," etc. to permit the ion exchanger to adsorb the peptide and the eluates containing the peptide is collected and lyphilized to give purified peptide.

According to the present invention it is essential to carry out the above peptide forming condensation reaction in the conventional solid phase process under the irradiation of ultrasonic waves.

The irradiation of ultrasonic waves makes it possible to increase the reaction velocity of the condensation reaction and to permit the reaction to proceed uniformly, with the result that homogeneous peptide can be obtained in a shortened period of the reaction time. In fact, according to the present process, the condensation reaction can usually be completed within a short period of 5 to 10 minutes, whereas the conventional condensation reaction in which no ultrasonic wave is irradiated requires 2 to 4 hours.

Through one cycle of this procedure, one mole of amino acid or its oligomer can be coupled uniformly to each of the amino acid and its oligomer initially bound to the resin. Thus, by repeating the desired number of the cycles, the desired number of amino acids or their oligomers can be coupled.

The ultrasonic waves to be used for this purpose are those having various frequencies, generally, of about 18 to 22 kc/sec, preferably of about 20 kc/sec.

The apparatuses for generating such ultrasonic waves are not particularly limited but various apparatuses are employable with satisfactory results. To apply ultrasonic waves, it is preferable to place a tip of ultrasonic vibrator in the reaction system and to generate ultrasonic waves. The reactor to be used is preferably one having a jacket for flowing water of a constant temperature.

Further according to this invention, ultrasonic waves can be applied not only to the condensation reaction step but also to the extracting step wherein the peptide formed is transferred to extracting solvent layer after cleaving peptide from resin, whereby the extraction time is reduced remarkably whereas the amount of extract increases greatly. In fact, the use of ultrasonic wave reduces the extraction time to about 3 to 5 minutes, whereas in the absence thereof it takes about 0.5 to 1 hour. Moreover, in accordance with the present process at least one of the pretreatment and after-treatment steps for peptide forming reaction such as swelling step, washing steps, deblocking step and neutralizing step can also be conducted under the irradiation of ultrasonic waves. The ultrasonic wave irradiation serves to promptly achieve the desired results. For instance when subjected to ultrasonic waves, the swelling step achieves effective swelling within a short period of time. Furthermore irradiation completes the washing step and deblocking step within a shorter time. Therefore, it is preferable to carry out the above pretreatment and after-treatment under irradiation of ultrasonic waves in the reactor for the peptide forming reaction which provides a tip of ultrasonic vibrator. In these cases ultrasonic waves having various frequencies are also applicable, but those having a frequency of 18 to 22 kc/sec are preferable as in the case of peptide forming reaction.

For a better understanding of the invention examples are given below.

EXAMPLE 1

110 g of ω-nitro-L-arginine was dissolved in 500 ml of 1N—NaOH solution, and to the solution was added a mixture of 85.9 g of tertiary butyloxycarbazide and 500 ml of dioxane. 84 ml of triethylamine was added to the resulting mixture and left to stand at room temperature for 48 hours. After distilling off low-boiling substances from the resulting reaction mixture under reduced pressure, the residue was dried on the potassium sulfate to produce 140 g of t-BOC-ω-nitro-L-arginine. 10 g of chloromethylated copolymer of styrene and divinyl benzene (copolymerization ratio by weight of 98:2) containing 0.84 milliequivalent of chlorine per gram of the copolymer was suspended in a mixture of 100 ml of ethyl alcohol and 50 ml of chloroform. To the suspension were added 10.4 g of t-BOC-ω-nitro-L-arginine obtained above and 4.7 ml of triethylamine, and the mixture was heated under reflux condition for 48 hours to bind the t-BOC-ω-nitro-L-arginine to the copolymer. The resulting resin was then washed with acetic acid and dried to produce 10.6 g of t-BOC-ω-nitro-L-arginyl-resin containing 0.21 milli mol of arginine per gram of the resin.

Into a reactor was placed 1.00 g of thoroughly dried t-BOC-ω-nitro-L-arginyl-resin thus obtained, and 10 ml of methylene chloride was added thereto to fully swell the resin. The methylene chloride was filtered off by an aspirator, and specified amounts of reagents were placed into the resin-containing reactor in the sequence listed in Table 1 below, each step listed being followed by irradiation with ultrasonic wave having a frequency of 20 kc/sec for a specified period of time. The resulting liquid phase was filtered off by an aspirator. Through one cycle of steps listed in Table 1, peptide in which one mole of amino acid used was condensed with one mole of the amino acid bound to the resin was obtained. In the specified sequence, various t-BOC-amino acids were used for the peptide forming reaction in the following order: t-BOC-L-phenylalanine, t-BOC-L-proline, t-BOC-L-phenylalanine, t-BOC-glycine, t-BOC-L-proline, t-BOC-L-proline, and t-BOC-ω-nitro-L-arginine. In the peptide forming reaction in each cycle ultrasonic wave was irradiated for 0.5 minute after the addition of t-BOC-amino acid, and then dicyclohexylcarbodiimide serving as a condensing agent was added to the system, followed by 2.5-minute irradiation with ultrasonic wave. Each of the t-BOC-amino acids was used in the form of solution dissolved in methylene chloride, and dicyclohexylcarbodiimide used was also used in the form of methylene chloride solution. This gave 1.15 g of t-BOC-ω-nitro-L-arginyl-L-prolyl-L-prolyl-glycyl-L-phenylalanyl-O-benzyl-L-seryl-L-prolyl-L-phenylalanyl-ω-nitro-L-arginyl resin.

is shown in FIG. 1 in which line-A shows the activity of the product, and line-B shows the activity of the authentic bradykinin.

EXAMPLE 2

Tertiary-BOC-L-alanyl-resin containing 0.287 millimole of L-alanine per gram of resin was prepared in the same manner as in Example 1, except that L-alanine was used in place of arginine. Into a reactor was placed t-BOC-L-alanyl-resin (containing 0.287 millimol of L-alanine per gram of resin) and methylene chloride was Table 1

| Step | Reagent | Amount of reagent | Sonication time (min) | Number of treatment |
| --- | --- | --- | --- | --- |
| Washing | Acetic acid | 10 ml | 1 | 1 |
| Deblocking | Hydrogen chloride | 10 ml | 3 | 2 |
| Washing | Dimethylformamide | 10 ml | 1 | 1 |
| Washing | Methylene chloride | 10 ml | 1 | 2 |
| Neutralization | 10 wt.% soln. of triethylamine in methylene chloride | 10 ml | 1 | 2 |
| Washing | Methylene chloride | 10 ml | 1 | 3 |
| Peptide forming reaction | t-BOC-amino acid | 5 ml | 3 | 2 |
|  | Dicyclohexylcarbodiimide | 0.15 g |  |  |
| Washing | Methylene chloride | 10 ml | 1 | 1 |
| Washing | Methyl alcohol | 10 ml | 1 | 1 |
| Washing | Methylene chloride | 10 ml | 1 | 1 |

919.4 mg of the peptide resin thus obtained was dried and thereafter treated in 15 ml of anhydrous hydrogen fluoride at 0°C for 60 minutes in the presence of 1.5 ml of anisole, whereby the peptide was cleaved from the resin. Subsequently, hydrogen fluoride and volatile substances were removed under a reduced pressure. The residue was suspended in 20 ml of 1N-acetic acid and irradiated with ultrasonic waves having a frequency of 20 kc/sec for 3 minutes for extraction. The liquid phase containing the free peptide was filtered by an aspirator, and the filtrate was passed through a column of "Amberlite IR-45." The column was washed with 1N-acetic acid. The eluates containing the peptide were collected and lyophilized. The resulting powder was dried over phosphorus pentoxide in a desiccator to obtain 177 mg of the desired product, i.e., bradykinin. Yield was 83.5%. The product had the same mobility as an authentic sample by paper electrophoresis using a buffer solution at pH 4.8 and an optical rotation (D line, 19°C) of −77.4° (C 1.28, 1N-acetic acid). The optical rotation of pure bradykinin was −76.5° (C 1.27, 1N-acetic acid) [literature: J. Amer. Chem. Soc. vol 86, page 304 (1964)]. The amino acid analysis of the product (hydrolyzed in 6N hydrochloric acid at 105°C for 24 hours) showed the values of 1.94 (2) for arginine, 0.95 (1) for serine, 1.00 (1) for glycine, 3.02 (3) for proline, and 2.04 (2) for phenylalanine. (Theoretical values are given in the parentheses). Bioassay of the product on guinea pig ileum muscle exhibited the same specific activity as that of the authentic bradykinin, as added thereto to fully swell the resin. After filtering off the methylene chloride, the reaction steps shown in Table 2 were conducted in the listed sequence, with each step carried out in the same manner as in Example 1, to add t-BOC-amino acids in the following order: t-BOC-ε-benzyloxycarbonyl-L-lysine, t-BOC-L-proline, t-BOC-O-benzyl-L-threonine, t-BOC-O-benzyl-L-tyrosine, t-BOC-L-phenylalanine, t-BOC-L-phenylalanine, t-BOC-glycine, and t-BOC-ω-nitro-L-arginine. This gave t-BOC-ω-nitro-L-arginyl-glycyl-L-phenylalanyl-L-phenylalanyl-O-benzyl-L-tyrosyl-O-benzyl-L-threonyl-L-prolyl-ε-benzyloxycarbonyl-L-lysyl-L-alanyl resin. The peptide resin thus obtained was treated with anhydrous hydrogen fluoride as in Example 1 to cleave the peptide from the resin. The peptide freed from the resin was then treated in the same manner as in Example 1, giving the desired product in the form of powder, i.e., L-arginylglycyl-L-phenylalanyl-L-phenylalanyl-L-tyrosyl-L-threonyl-L-prolyl-L-lysyl-L-alanine. The product was subjected to paper electrophoresis using a buffer solution at pH 4.8 and to color reaction according to ninhydrin; Pauli and Sakaguchi method and was found to give a single spot. The amino acid analysis of the product (hydrolyzed in 6N hydrochloric acid at 105°C for 24 hours) showed the values of 0.84 (1) for lysine, 0.83 (1) for arginine, 0.85 (1) for threonine, 0.77 (1) for proline, 1.07 (1) for glycine, 1.00 (1) for alanine, 0.66 (1) for tyrosine, and 1.92 (2) for phenylalanine. (Theoretical values are given in the parentheses.).

Table 2

| Step | Reagent | Amount of reagent | Sonication time (min) | Number of treatment |
| --- | --- | --- | --- | --- |
| Deblocking | 50 wt.% soln. of trifluoroacetic acid in methylene chloride | 10 ml | 3 | 2 |
| Washing | Methylene chloride | 10 ml | 1 | 2 |

Table 2 —Continued

| Step | Reagent | Amount of reagent | Sonication time (min) | Number of treatment |
| --- | --- | --- | --- | --- |
| Neutralization | Ethyl alcohol-methylene chloride | 10 ml | 1 | 2 |
| Washing | Methylene chloride | 10 ml | 1 | 3 |
| Peptide forming reaction | t-BOC-amino acid | 10 ml | 1 | 2 |
| | Dicyclohexyl carbodiimide | 0.17 g | 3 | |
| Washing | Methylene chloride | 10 ml | 1 | 1 |
| Washing | Methyl alcohol | 10 ml | 1 | 1 |
| Washing | Methylene chloride | 10 ml | 1 | 2 |

What we claim is:

1. In producing a peptide by coupling an amino acid or oligomer thereof with an amino acid or its oligomer bound to a resin to form a peptide on the resin, cleaving the peptide from the resin and thereafter extracting the peptide, a process which is characterized in that said peptide forming reaction is conducted under the irradiation of ultrasonic waves.

2. The process for producing a peptide according to claim 1, in which said ultrasonic waves are those having frequencies of about 18 to 22 kc/sec.

3. The process for producing a peptide according to claim 2, in which said ultrasonic waves are those having frequencies of about 20 kc/sec.

4. The process for producing a peptide according to claim 1, in which said peptide forming reaction and extraction of peptide are conducted under the irradiation of ultrasonic waves.

5. The process for producing a peptide according to claim 4, in which said ultrasonic waves are those having frequencies of about 18 to 22 kc/sec.

6. The process for producing a peptide according to claim 1, in which said peptide forming reaction and at least one of the pretreatment and aftertreatment steps for the peptide forming reaction are conducted under the irradiation of ultrasonic waves.

7. Peptide obtained by the method claimed in claim 1.

* * * * *